United States Patent
Ayukawa et al.

(10) Patent No.: US 8,810,230 B2
(45) Date of Patent: Aug. 19, 2014

(54) POWER SUPPLY DEVICE AND SEMICONDUCTOR DEVICE

(75) Inventors: Kazuhito Ayukawa, Kanagawa (JP); Nobutoshi Kasai, Kanagawa (JP); Daisuke Iijima, Kanagawa (JP)

(73) Assignee: Renesas Electronics Corporation, Kanagawa (JP)

(*) Notice: Subject to any disclaimer, the term of this patent is extended or adjusted under 35 U.S.C. 154(b) by 733 days.

(21) Appl. No.: 13/052,409

(22) Filed: Mar. 21, 2011

(65) Prior Publication Data

US 2011/0255319 A1 Oct. 20, 2011

(30) Foreign Application Priority Data

Apr. 19, 2010 (JP) .................................. 2010-095915

(51) Int. Cl.
  *H02M 1/42* (2007.01)
(52) U.S. Cl.
  USPC .......................................... 323/288; 323/271
(58) Field of Classification Search
  USPC .................... 323/271–288, 312–317
  See application file for complete search history.

(56) References Cited

U.S. PATENT DOCUMENTS

| 5,852,359 | A | * | 12/1998 | Callahan et al. | ............... | 323/274 |
| 6,034,513 | A | * | 3/2000 | Farrington et al. | ........... | 323/222 |
| 6,218,820 | B1 | * | 4/2001 | D'Arrigo et al. | .............. | 323/285 |
| 6,583,610 | B2 | * | 6/2003 | Groom et al. | .................. | 323/288 |
| 7,466,110 | B2 | * | 12/2008 | Tsuruya | ........................ | 323/207 |
| 7,923,980 | B2 | | 4/2011 | Takahashi et al. | | |
| 8,248,040 | B2 | * | 8/2012 | Rausch et al. | ................. | 323/207 |
| 2009/0257258 | A1 | | 10/2009 | Ayukawa et al. | | |

FOREIGN PATENT DOCUMENTS

| JP | 10-174428 A | 6/1998 |
| JP | 2002-320379 A | 10/2002 |
| JP | 2004-282958 A | 10/2004 |
| JP | 2007-195282 A | 8/2007 |
| JP | 2009-100607 A | 5/2009 |
| JP | 2009-261042 A | 11/2009 |

OTHER PUBLICATIONS

Japanese Office Action received in Japanese Application No. 2010-095915 dated Jan. 7, 2014.

* cited by examiner

*Primary Examiner* — Jessica Han
(74) *Attorney, Agent, or Firm* — Mattingly & Malur, PC

(57) ABSTRACT

Switching loss is reduced by decreasing the switching frequency of a PFC power supply in light load condition, whereas the switching frequency is maintained high in heavy load operation. Efficiency in light load operation is thus improved without enlarging a boosting inductor and an output smoothing capacitor. A capacitor is provided in a triangular wave generating circuit and the triangular wave generating circuit outputs a triangular wave by charging and discharging this capacitor. Charging and discharging of the capacitor are controlled by an oscillation frequency control circuit output current which is input to a comparator.

19 Claims, 11 Drawing Sheets

POWER SUPPLY DEVICE AND SEMICONDUCTOR DEVICE

CROSS-REFERENCE TO RELATED APPLICATIONS

The disclosure of Japanese Patent Application No. 2010-95915 filed on Apr. 19, 2010 including the specification, drawings and abstract is incorporated herein by reference in its entirety.

BACKGROUND

The present invention relates to a power supply device and a semiconductor device for use therein and, particularly, to a power supply device having a power factor correction circuit.

Power supply devices for use in servers, home appliances, etc. have a problem in which reactive power is generated due to a difference between input voltage and input current waveforms, when converting alternate current (AC) to direct current (DC). Another problem concerned is that such a difference between the waveforms of an input voltage and an input current gives rise to a harmonic current that becomes noise having effect on other electrical equipment and the like. As a countermeasure against this problem, power factor correction (PFC) is performed that shapes the waveform of an input current into a phase and waveform equivalent to those of an input voltage.

Examples of power factor correction circuits are described in Japanese Unexamined Patent Publication No. Hei 10 (1998)-174428 (Patent Document 1), Japanese Unexamined Patent Publication No. 2009-261042 (Patent Document 2), and Japanese Unexamined Patent Publication No. 2007-195282 (Patent Document 3).

RELATED ART DOCUMENTS

Patent Documents

[Patent Document 1] Japanese Unexamined Patent Publication No. Hei 10 (1998)-174428
[Patent Document 2] Japanese Unexamined Patent Publication No. 2009-261042
[Patent Document 3] Japanese Unexamined Patent Publication No. 2007-195282

SUMMARY

In a power supply device, when a MOSFET or the like used as a switch is turned ON/OFF, changes in a gate drive current, a drain voltage, and a drain current change result in a loss (switching loss). This gives rise to a problem of a decrease in power conversion efficiency. The lower the switching frequency, that is, the smaller the number of times of switching per unit time, the switching loss becomes smaller. However, simply reducing the number of times of switching per unit time is not practical, because it is required for this purpose to enlarge an inductor and an output smoothing capacitor of the power supply device, which leads to an increase in a die area or a packaging area.

One object of the present invention is to provide means for improving the characteristics of a power supply device having a power factor correction circuit and a semiconductor device for use therein.

The above-noted and other objects and novel features of the present invention will become apparent from the following description in the present specification and the accompanying drawings.

Typical aspects of the invention disclosed in this application are summarized as follows.

A power supply device pertaining to a typical embodiment of the present invention is characterized by having a PFC controller that includes an error amplifier amplifying a difference between an output voltage of a voltage diving circuit which divides a voltage on an output terminal and a first reference voltage, an oscillation frequency control circuit converting an output of the error amplifier to a current, a triangular wave generating circuit outputting a triangular wave from an output current of the oscillation frequency control circuit, and a PWM control circuit opening and closing a switch, based on the triangular wave output by the triangular wave generating circuit.

The power supply device may be characterized in that the triangular wave generating circuit includes a capacitor and outputs the triangular wave by charging and discharging the capacitor.

The power supply device may be characterized in that the triangular wave generating circuit further includes a first current mirror circuit having two outputs and a second current mirror circuit having one output, a current output of the second current mirror circuit is a replica of one current output of the first current mirror circuit, the other current output of the first current mirror circuit and the current output of the second current mirror circuit are coupled via a MOSFET, and the MOSFET conducts charging and discharging the capacitor coupled to a node coupling the MOSFET and the current output of the second current mirror circuit.

The power supply device may be characterized in that the triangular wave generating circuit further includes a comparator to which a constant voltage is input, the comparator compares a voltage on the node coupling the capacitor, the current output of the second current mirror circuit, and the MOSFET to this constant voltage, and the capacitor is, charged and discharged by opening and closing the MOSFET.

The power supply device may be characterized in that a voltage on the node coupling the current output of the second current mirror circuit, the MOSFET, and the comparator is output as the triangular wave.

The power supply device may be characterized in that the oscillation frequency control circuit includes a transistor and an output of the error amplifier is input to a gate terminal of the transistor.

The power supply device may be characterized in that a third current mirror circuit is coupled to a collector terminal of the transistor and a current output of the third current mirror circuit is an output of the oscillation frequency control circuit.

The power supply device may be characterized in that the oscillation frequency control circuit further includes a constant current source, a fourth current mirror circuit is coupled to the collector terminal of the transistor, and a current resulting from subtracting an output of the fourth current mirror circuit from an output current of the constant current source is an output current of the oscillation frequency control circuit.

The power supply device may be characterized in that the oscillation frequency control circuit further includes a clamp circuit coupled to an emitter terminal of the transistor.

The power supply device may be characterized in that the power supply device is a continuous mode type in which currents are interleaved and the PWM control circuit controls a switch in each of subsystems respectively.

A power supply device pertaining to a typical embodiment of the present invention is characterized by having a resistor for output current measurement and a PFC controller that includes a potential difference amplifier amplifying a voltage across the resistor for output current measurement, a triangular wave generating circuit outputting a triangular wave from an output current of the potential difference amplifier, and a PWM control circuit opening and closing a switch, based on the triangular wave output by the triangular wave generating circuit.

It is possible to improve the characteristics of a power semiconductor device for use therein.

DETAILED DESCRIPTION

As for embodiments, as will be described hereinafter, a plurality of sections or embodiments is separately described, as necessary for the sake of expedience. Unless otherwise specified, however, these sections or embodiments are not independent of each other; rather, they correlate in such a manner that one of them provides an example of modification to or further detailed or supplementary explanation of another one of them in part or in whole. In embodiments, as will be discussed hereinafter, where the number of elements or the like (including the number of pieces, a value, a quantity, a range, etc.) is mentioned, unless otherwise specified and unless it is obviously limited to a given number in principle, it is not limited to the given number and may be either more than or less than the given number.

Moreover, it goes without saying that components of an embodiment, as will be discussed hereinafter, are not always indispensable ones, unless otherwise specified and unless a component is obviously considered as indispensable in principle. Although not restrictive, circuit elements making up each function block of an embodiment are formed over a semiconductor substrate like monocrystalline silicon by integrated circuit technology such as CMOS (Complementary Metal Oxide Semiconductor Field Effect Transistor). MOSFET (Metal Oxide Semiconductor Field Effect Transistor), if mentioned in an embodiment, does not exclude a non-oxide film as a gate insulation film. A gate length and a gate width of a MOSFET are expressed with symbols L and W, respectively. W/L denotes a ratio of a gate width to a gate length.

In the following, embodiments of the present invention will be described using the drawings.

First Embodiment

Overview of Power Supply Device

Figure 1:
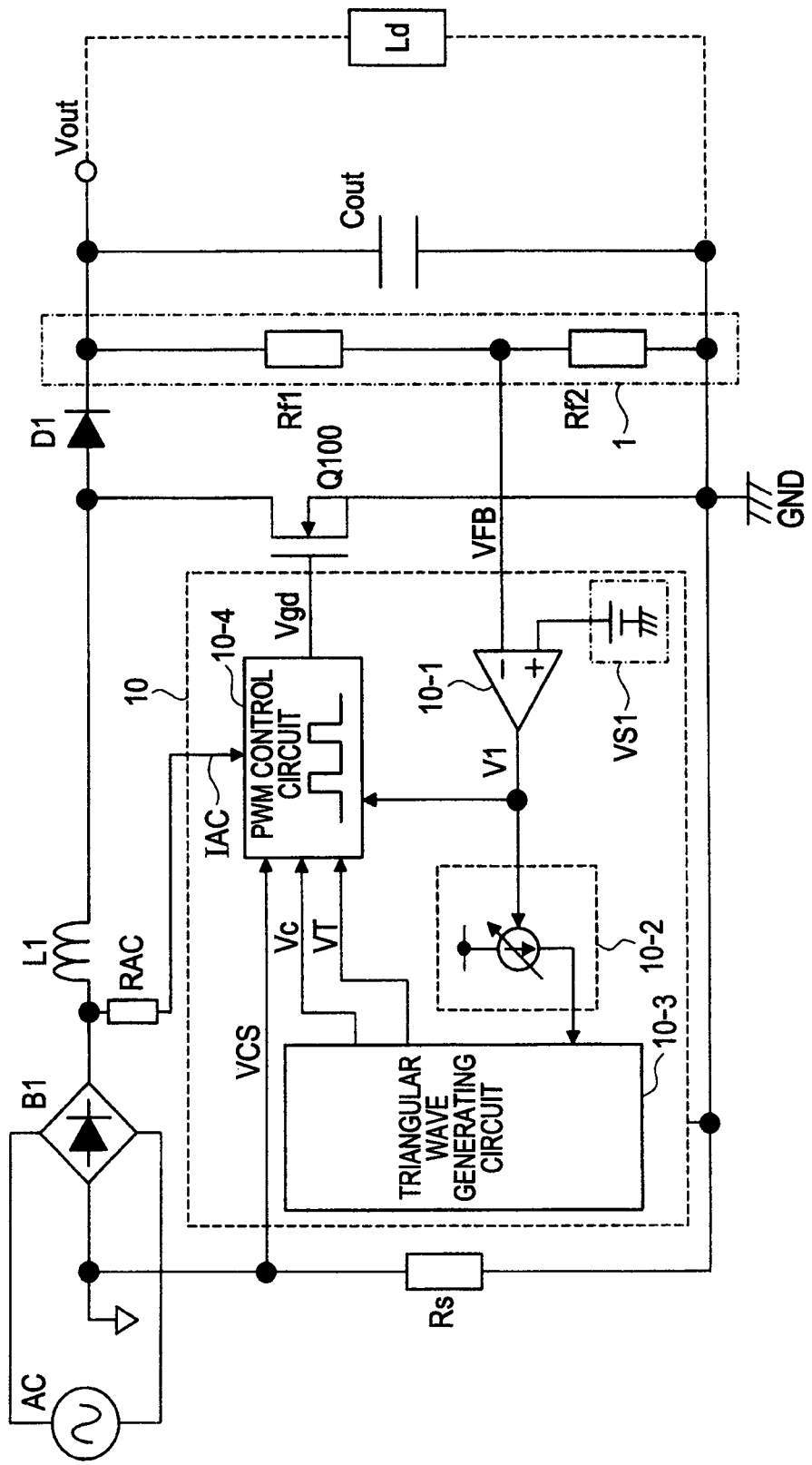
FIG. 1 is a circuit diagram representing a configuration of a power supply device pertaining to a first embodiment of the present invention.

FIG. 1 is a circuit diagram representing a configuration of a power supply device pertaining to a first embodiment with a load Ld that is coupled to this power supply device.

This power supply device includes a PFC controller 10 (a PFC controller IC, a power factor correction controller, a power factor correction controller IC, a semiconductor device) and a switch Q100, besides a diode bridge B1, an inductor L1 (a boosting inductor, a coil, a boosting coil), a diode D1, a voltage dividing circuit 1, an output smoothing capacitor Cout, and a current detecting resistor Rs, and a resistor RAC. The power supply device that takes a power factor correction measure using such PFC controller is also called an active filter type. Although the diode bridge B1 is a full-wave rectifying circuit in which four diodes are coupled in a bridge form, its simplified form is shown as in FIG. 1.

The inductor L1 is used to boost an input voltage (voltage output from the diode bridge B1). To the inductor L1, the switch Q100 is coupled. As the switch Q100, an element such as a MOSFET or IGBT (Insulated Gate Bipolar Transistor) is used. The diode D1 is a passive element for rectification to control current to follow in one direction.

The voltage dividing circuit 1 is comprised of resistors Rf1 and Rf2. This circuit divides a potential difference between an voltage Vout on an output terminal and a ground level and outputs a result as voltage information VFB (=Vout Rf2/ (Rf1+Rf2)) to the PFC controller 10.

The current detecting resistor Rs is a grounded resistor to detect a voltage current information output VCS) between the diode bridge B1 and the ground potential.

The current detecting resistor RAC is a resistor to detect current output information IAC. One end of the current detecting resistor RAC is coupled to a node coupling the diode bridge B1 and the inductor L1 and the other end thereof is input to a multiplier #1 in a PWM control circuit 10-4.

Current detection information IAC is a voltage that is determined by a resistance value of the current detecting resistor RAC and a potential difference between both ends of the current detecting resistor RAC.

The PFC controller 10 is a control circuit that takes inputs of the voltage information VFB and the current information output VCS and performs switching of the switch Q100.

The PFC controller 10 in the present first embodiment includes an error amplifier 10-1, an oscillation frequency control circuit 10-2, a triangular wave generating circuit 10-3, and a PWM control circuit 10-4. Although not restrictive, these circuits making up the PFC controller 10 is formed within a single semiconductor chip (semiconductor substrate).

The error amplifier 10-1 is an operational amplifier that amplifies a difference between an output voltage (voltage information VFB) of the voltage dividing circuit 1 and a reference voltage VS1. If we let A denote the gain of the operational amplifier, then the output voltage V1 of the error amplifier 10-1 is expressed as follows: V1=A×(VS1−VFB). In a case where the load Ld coupled to the power supply device is heavy (in other words, power consumed by the load Ld is large), the output voltage Vout decreases and VFB becomes low. Hence, V1 becomes high. Conversely, in a case where the load coupled to the power supply device is light (in other words, power consumed by the load Ld is small), V1 becomes low. That is, the output voltage V1 of the error amplifier 10-1 is changed depending on the load Ld. Here, one feature is that the output voltage V1 of the error amplifier 10-1 continuously changes depending on the load Ld.

The oscillation frequency control circuit 10-2 is a control circuit that adjusts the output of a constant current source incorporated therein, based on the output voltage V1 of the error amplifier 10-1, and controls the triangular wave generating circuit 10-3.

The triangular wave generating circuit 10-3 is a circuit that outputs a triangular wave (ramp wave) voltage VT to the PWM control circuit 10-4.

The PWM control circuit 10-4 is a control circuit that changes the pulse width of a signal to be input to a gate terminal of the switch Q100 in order to make the switch Q100 On (conducting)/Off (non-conducting).

When the switch Q100 is On, energy is stored in the inductor L1; when it is Off, the input voltage and the energy in the inductor L1 are added. Then, this energy is supplied as a current to the output smoothing capacitor Cout via the diode D1. Thereby, it is possible to boost the input voltage. In addition, by adjusting the On/Off ratio (duty ratio) of the switch Q100, it is possible to adjust a value of the output voltage Vout.

<<PWM Control Circuit>>

Figure 2:
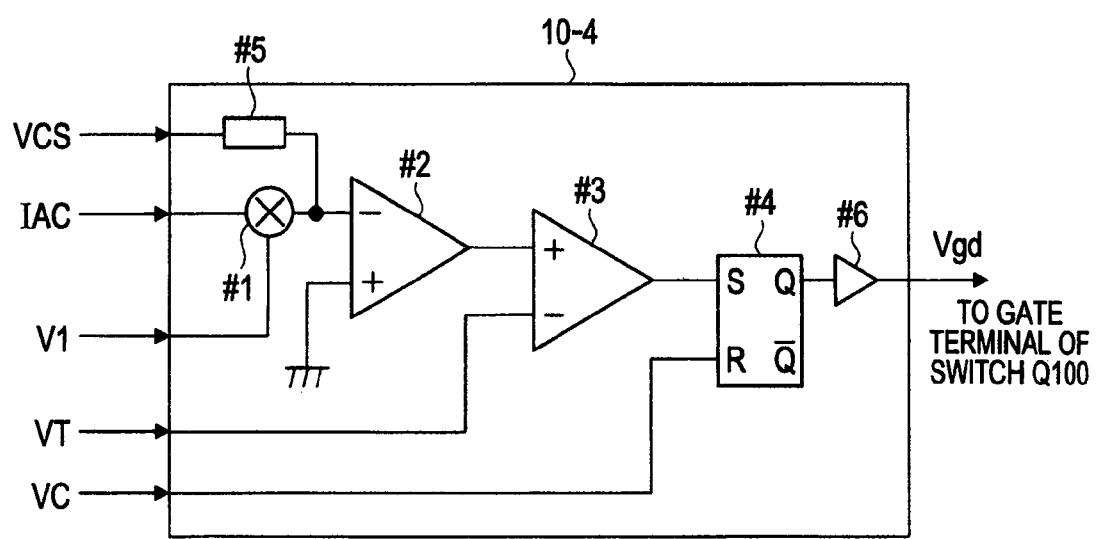
FIG. 2 is a circuit diagram representing a configuration of a PWM control circuit.

FIG. 2 is a circuit diagram representing a configuration of this PWM control circuit 10-4.

The PWM control circuit 10-4 includes a multiplier #1, an error amplifier #2, a comparator #3, a flip-flop #4, a resistor #5, and a buffer #6.

The multiplier #1 is an analog multiplier that multiplies the output voltage V1 of the error amplifier 10-1 by the output voltage of the current detecting resistor RAC and outputs an voltage proportional to the product.

The error amplifier #2 amplifies an error between the output of the multiplier and the ground voltage. At this time, via the resistor #5, the current information output VCS is coupled to the output of the multiplier which is input to the error amplifier #2. Thereby, a feedback depending on a voltage that is applied to the resistor #5 via the resistor Rs is input to the error amplifier #2.

The comparator #3 compares an output voltage of the error amplifier #2 and a triangular wave voltage VT which is output by the triangular wave generating circuit 10-3 and outputs an error between them.

The flip-flop #4 is an RS flip-flop circuit for driving an On/Off control terminal (gate terminal) of the switch Q100. When an output value of "1" of the above comparator #3 is input to a set terminal of the flip-flop #4, the flip-flop #4 outputs "1". When a reset pulse is input to a reset terminal of the flip-flop #4 (i.e., the reset terminal turns to "1"), the flip-flop #4 outputs "0".

The buffer #6 is an analog buffer circuit that outputs a linear output voltage Vgd in response to a predefined range of input voltages, so that its output voltage can drive the On/Off control terminal of the switch Q100. This output voltage Vgd continuously changes depending on the output voltage V1 of the error amplifier 10-1.

<<Oscillation Frequency Control Circuit and Triangular Wave Generating Circuit>>

Figure 3:
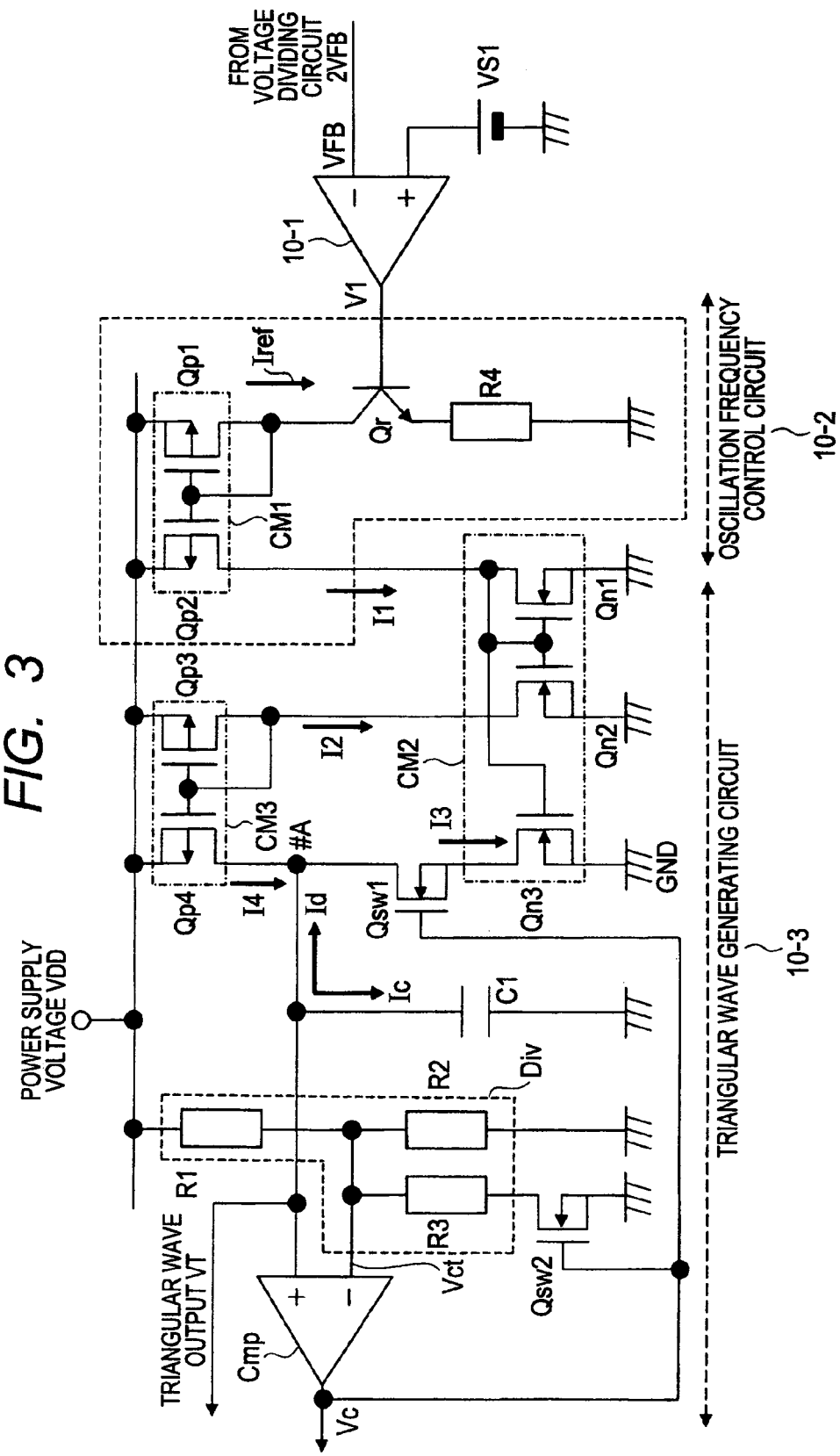
FIG. 3 is a circuit diagram representing a concrete configuration comprehending an oscillation frequency control circuit and a triangular wave generating circuit pertaining to the first embodiment of the present invention.

FIG. 3 is a circuit diagram representing a concrete configuration comprehending the oscillation frequency control circuit 10-2 and the triangular wave generating circuit 10-3 pertaining to the first embodiment.

The oscillation frequency control circuit 10-2 is comprised of a resistor R4, a transistor Qr, and P-channel type MOSFETs Qp1 and Qp2 making up a current mirror circuit CM1.

The transistor Qr provides an emitter-follower output. The transistor Qr adjusts a current flowing across the resistor R4 and a reference current Iref according to a voltage (i.e., the output voltage of the error amplifier 10-1) that is applied to its gate terminal. As the transistor Qr, a bipolar transistor or MOSFET is used.

The current mirror circuit CM1 reflects the reference current Iref flowing in a collector terminal of the transistor Qp1 to a drain terminal of the transistor MOSFET Qp2, thus making an output current I1. At this time, a ratio between the currents Iref and I1 is determined by the W/L ratio of each of the MOSFETs Qp1 and Qp2.

The triangular wave generating circuit 10-3 includes a current mirror circuit CM2 and a current mirror circuit CM3 for drawing an input current (I1 in FIG. 3) into a main operating part of the triangular wave generating circuit 10-3.

The current mirror circuit CM2 is comprised of N-channel type MOSFETs Qn1, Qn2, Qn3. The current mirror circuit CM3 is comprised of P-channel type MOSFETs Qp3, Qp4.

To a drain terminal of a MOSFET Qn1 in the current mirror circuit CM2, the output current I1 of the oscillation frequency control circuit 10-2 is input. Depending on this current I1, a current I2 and a current I3 flow through a MOSFET Qn2 and a MOSFET Qn3, respectively. A ratio between the currents I1 and I2 is determined by the W/L ratio of each of the MOSFETs Qn1 and Qn2. Similarly, a ratio between the currents I1 and I3 is determined by the W/L ratio of each of the MOSFETs Qn1 and Qn3. Further, depending on the above current I2, a current I4 flows through a MOSFET Qp4. A ratio between the currents I2 and I4 is determined by the W/L ratio of each of the MOSFETs Qp3 and Qp4.

A drain terminal of the MOSFET Qp4 and a drain terminal of the MOSFET Qp3 are electrically coupled via a MOSFET Qsw1. A voltage on a node #A coupling the MOSFET Qp4 and the MOSFET Qsw1 is input to a comparator Cmp. A capacitor C1 is also coupled to the coupling node #A. As will be detailed further on, by repeating storing charge on the capacitor C1 and discharging, the voltage on the coupling node #A is changed and the triangular wave voltage VT is generated.

The MOSFET Qsw1 is a switch to turn on/off the electrical coupling between the drain terminal of the MOSFET Qp4 and the MOSFET Qn3. An output voltage Vc of the comparator Cmp, which will be described later, is input to a gate terminal of the MOSFET Qsw1.

When the MOSFET Qsw1 is Off (in the non-conducting state), most of the current I4 flowing through the MOSFET Qp4 is directed toward the capacitor C1. This is because the comparator Cmp and other circuits coupled to the coupling node #A are regarded as having a high impedance. Therefore, if we let Ic denote a current flowing into the capacitor C1, a relation that I4 is approximately equal to Ic becomes true. Due to this current Ic, charge is stored in the capacitor C1 and the voltage (triangular wave voltage VT) on the coupling node #A rises.

On the other hand, when the MOSFET Qsw1 is On (in the conducting state), the charge stored in the capacitor C1 flows toward ground GND via the MOSFETs Qsw1 and Qn3. If we let I4 denote a current flowing from the MOSFET Qp4 to the coupling node #A, Id denote a current flowing from the capacitor C1 to the coupling node #A, and I3 denote a current flowing through the MOSFETs Qsw1 and Qn3, a relation: Id=I3−I4 holds true. Here, because the value of the current I4 does not become 0 in the current mirror circuit CM3, the value of the current I3 needs to be larger than the value of the current I4 to discharge the charge stored in the capacitor C1. By way of example, let us consider a case in which the W/L ratios of the MOSFETs Qn1, Qn2, Qp3, and Qp4 are set so that the values of the currents I1, I2, and I4 are substantially equal. In this case, by making the W/L ratio of the MOSFET Qn3 larger than the W/L ratio of the MOSFET Qn1 and making the value of the current I3 larger than the current I1, the value of the current I3 can be made larger than the value of the current I4.

That is, by making the current I3>the current I4, the charge stored in the capacitor C1 is discharged; accordingly, the potential (triangular wave voltage VT) on the coupling node #A falls.

A voltage dividing circuit Div which is comprised of resistors R1, R2, R3 generates a reference voltage Vct for the comparator Cmp.

An N-channel type MOSFET Qsw2 is a switch to determine whether or not the resistors R2 and R3 are coupled in parallel. When the MOSFET Qsw2 is Off (in the non-conducting state), the reference voltage Vct becomes a value of VctH yielded by diving a power supply voltage VDD by the resistors R1 and R2: i.e., VctH=VDD×R2/(R1+R2). On the other hand, the MOSFET Qsw2 becomes On (transits into the conducting state), the resistors R2 and R3 are coupled in parallel and the value of the reference voltage Vct falls to VctL=VDD×R2 R3/(R1+R2) (R2+R3). Here, as an example of the power supply voltage VDD, approximately 5 V is used.

The comparator Cmp is for comparing the reference voltage Vct and the voltage on the coupling node #A. The comparator Cmp outputs a Low level signal (a voltage of 0) when the voltage on the coupling node #A is lower than the reference voltage Vct and outputs a High level signal (a voltage of VcH) when the voltage on the coupling node #A is higher than the reference voltage Vct. Depending on the output voltage Vc of the comparator Cmp, turning the MOSFET Qsw1 and the MOSFET Qsw2 On/Off is controlled.

<<Operation of Triangular Wave Generating Circuit>>

Figure 4:
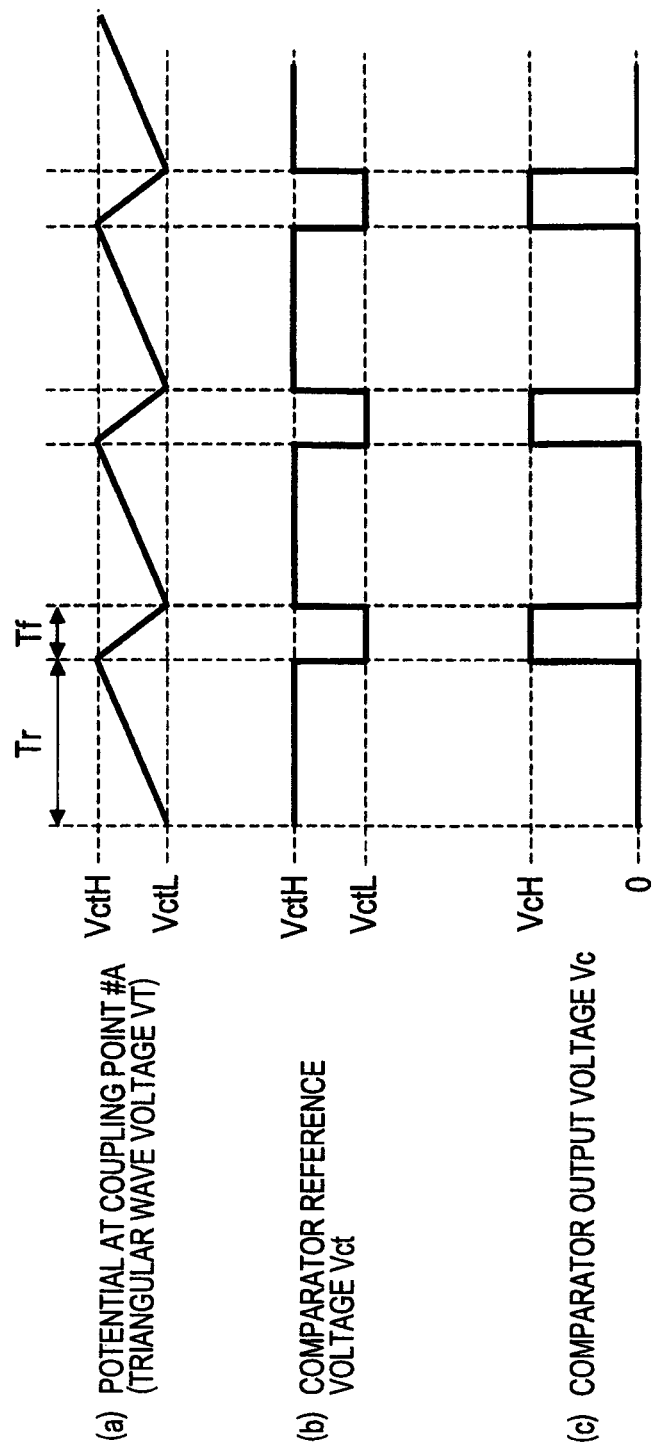
FIG. 4 is a chart to explain operation of the triangular wave generating circuit pertaining to the first embodiment of the present invention.

Using FIG. 3 and FIG. 4, how the voltage (triangular wave voltage VT) on the coupling node #A changes is explained (let us consider a case when, as an initial state, the MOSFETs Qsw1 and Qsw2 are Off and the reference voltage Vct is VctH as mentioned above).

(1) When the MOSFET Qsw1 is Off, the current Ic flows in the capacitor C1 and charge is stored therein; due to this, the voltage on the coupling node #A rises (for a period of Tr).

(2) When the voltage on the coupling node #A has reached the above reference voltage VctH, the output voltage Vc of the comparator Cmp turns to High (voltage VcH).

(3) When the output voltage Vc of the comparator Cmp turns to High, the MOSFET Qsw1 turns On, charge is discharged from the capacitor C1, and the voltage on the coupling node #A falls. Further, the MOSFET Qsw2 turns On and the reference voltage Vct falls to VctL (for a period of Tf).

(4) When the voltage on the coupling node #A has fallen down to the reference voltage VctL, the output voltage Vc of the comparator Cmp turns to Low (voltage of 0).

(5) When the output voltage Vc of the comparator Cmp turns to Low, the MOSFETs Qsw1 and Qsw2 turn Off and the reference voltage Vct starts to rise to VctH again.

By repeating the foregoing sequence from (1) to (5), the voltage on the coupling node #A has a triangular waveform, as shown in FIG. 4(a).

<<Dependency of Switching Frequency on Load Factor>>

Figure 5:
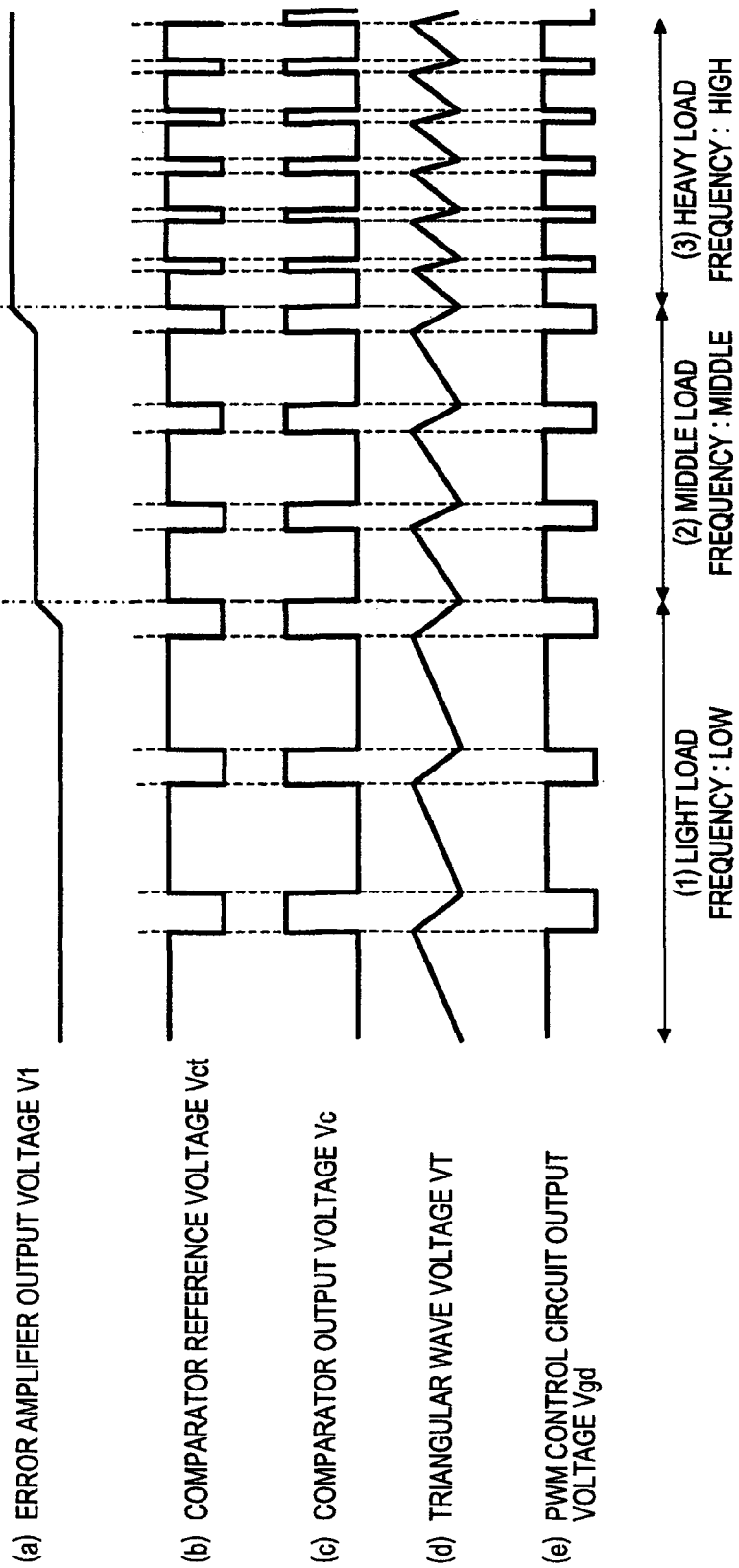
FIG. 5 is a graph to explain how the frequency of the oscillation frequency control circuit changes.

FIG. 5 is a chart showing the waveforms of (a) output voltage Vct of the error amplifier 10-1, (b) reference voltage Vct of the comparator Cmp, (c) output voltage Vc of the comparator Cmp, (d) triangular wave voltage VT (voltage on the coupling node #A in FIG. 3), and (e) output voltage Vgd of the PWM control circuit 10-4, when the load Ld in FIG. 1 is (1) light, (2) middle, and (3) heavy.

Three patterns are explained separately, when the power supply device is in (1) light load operation, (2) middle load operation, and (3) heavy load operation.

(1) As described above, when in light load operation, the output voltage V1 of the error amplifier 10-1 is a low value. Therefore, the value of the current Iref in FIG. 3 is small; accordingly, the values of the currents I1 to I4 are small. Due to this, time taken to store charge in the capacitor C1 and discharging time become longer and, thus, the periods Tr and Tf in FIG. 4 become longer. Hence, the frequency of the output voltage VT of the triangular wave generating circuit 10-3 is low. Accordingly, the frequency of the output voltage Vgd of the PWM control circuit 10-4 as a signal that controls turning the switch Q100 On/Off is low. That is, the switching frequency of the switch Q100 is low. Here, light load refers to a load factor on the order of 20%, by way of example.

In contrast, when in (3) heavy load operation, the output voltage V1 of the error amplifier 10-1 is a high value and, therefore, the switching frequency of the switch Q100 is high, contrary to (1) light load operation. When in (2) middle load operation, the switching frequency of the switch Q100 is middle between that in (1) light load operation and that in (3) heavy load operation (3). Here, by way of example, the switching frequency may be on the order of 30 KHz in (1) light load operation, 50 KHz in middle load operation (2), and 100 kHz in heavy load operation (3).

As previously noted, the output voltage V1 of the error amplifier 10-1 continuously changes depending on the load Ld. Moreover, since the output voltage Vgd of the PWM control circuit 10-4 continuously changes depending on the output voltage V1 of the error amplifier 10-1, the output voltage Vgd of the PWM control circuit 10-4 continuously changes depending on the load Ld. Hence, it is possible to continuously change the frequency of the output voltage Vgd of the PWM control circuit 10-4 as a signal that controls turning the switch Q100 On/Off (switching frequency) depending on the load Ld.

By configuring the power supply device in the way described above, circuit operation as will be described further below is feasible.

Figure 6:
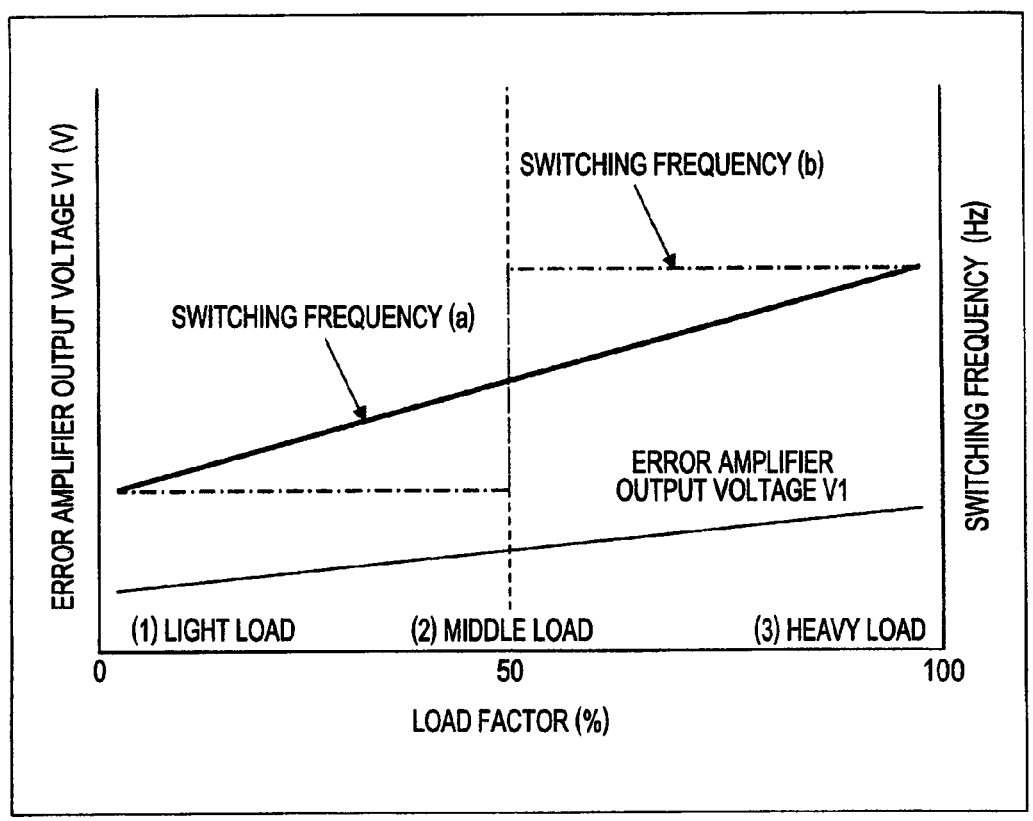
FIG. 6 is a graph showing a relationship among load factor, output voltage of an error amplifier, and switching frequency.

FIG. 6 is a graph showing a relationship among load factor of the power supply device, output voltage V1 of the error amplifier 10-1, and switching frequency. Here, the load factor is a ratio of a momentary load to a maximum rated load of the power supply device; in other words, a ratio of a momentary power to a maximum rated power of the power supply device. It may also refer to a ratio of the load Ld in FIG. 1 to the maximum rated power of the power supply device. Exemplary values of the maximum rated power may be on the order of 500 W for the power supply device for a personal computer and on the order of 2000 W for the power supply device for an air-conditioner. Exemplary values of loads in (1) light load operation, (2) middle load operation, and (3) heavy load operation are, for example, given approximately as follows. For the power supply device for a personal computer; in (1), load ranging from 0 to 150 W and load factor ranging from 0 to 30%; in (2), load ranging from 150 W to 350 W and load factor ranging from 30% to 70%; and in (3), load ranging from 350 W to 500 W and load factor ranging from 70% to 100%. For the power supply device for an air-conditioner; in (1), load ranging from 0 to 500 W and load factor ranging from 0 to 25%; in (2), load ranging from 500 W to 1000 W and load factor ranging from 25% to 50%; in (3), load ranging from 1000 W to 2000 W and load factor ranging from 50% to 100%.

In the graph, a solid line (a) represents a relationship between load factor and switching frequency with regard to the present first embodiment. For the sake of reference, a chain line (b) represents a relationship between load factor and switching frequency in the case of a power supply device described in Patent Document 1.

In the present first embodiment, the output voltage V1 from the error amplifier 10-1 linearly changes depending on the load factor. That is, it can be regarded that what amount of the load coupled to the power supply device is determined by the error amplifier 10-1 and, correspondingly, the error amplifier outputs a suitable value of the output voltage V1. Thereby, it is possible to linearly change the switching frequency, so that the switching frequency will be low when the power supply device is in light load operation and will be high when in heavy load operation.

By contrast, in the power supply device described in Patent Document 1, the switching frequency can assume only two values and the switching frequency does not linearly change depending on the load factor.

If the power supply device having the PFC controller of the present first embodiment is used, it is possible to maintain the switching frequency high during heavy load operation. For this reason, the inductor L1 and the output smoothing capacitor Cout are not required to have large values of inductance and capacitance. Hence, it is avoidable to increase the die area or packaging area of the power supply device. It is also possible to decrease the switching frequency of the switch Q100 in light load condition. For this reason, it is possible to improve the power conversion efficiency in light load operation. Therefore, it is possible to achieve a high power conversion efficiency over a wide range of loads by improving the power conversion efficiency in light load operation, which has been a problem in the past.

If the power supply device having the PFC controller of the present first embodiment is used for a home appliance product such as, e.g., an air-conditioner, it is possible to improve the power conversion efficiency during steady load operation in addition to improving the power conversion efficiency at maximum power required when the home appliance product is powered on.

This power supply device also satisfies standards, inter alia, ENERGY STAR (a power saving program for electrical equipment promoted by the US Environmental Protection Agency) and 80plus (a power saving program for electrical equipment promoted by the 80plus program (www.80plus.org)).

Second Embodiment

Then, a second embodiment is described using the drawings.

Figure 7:
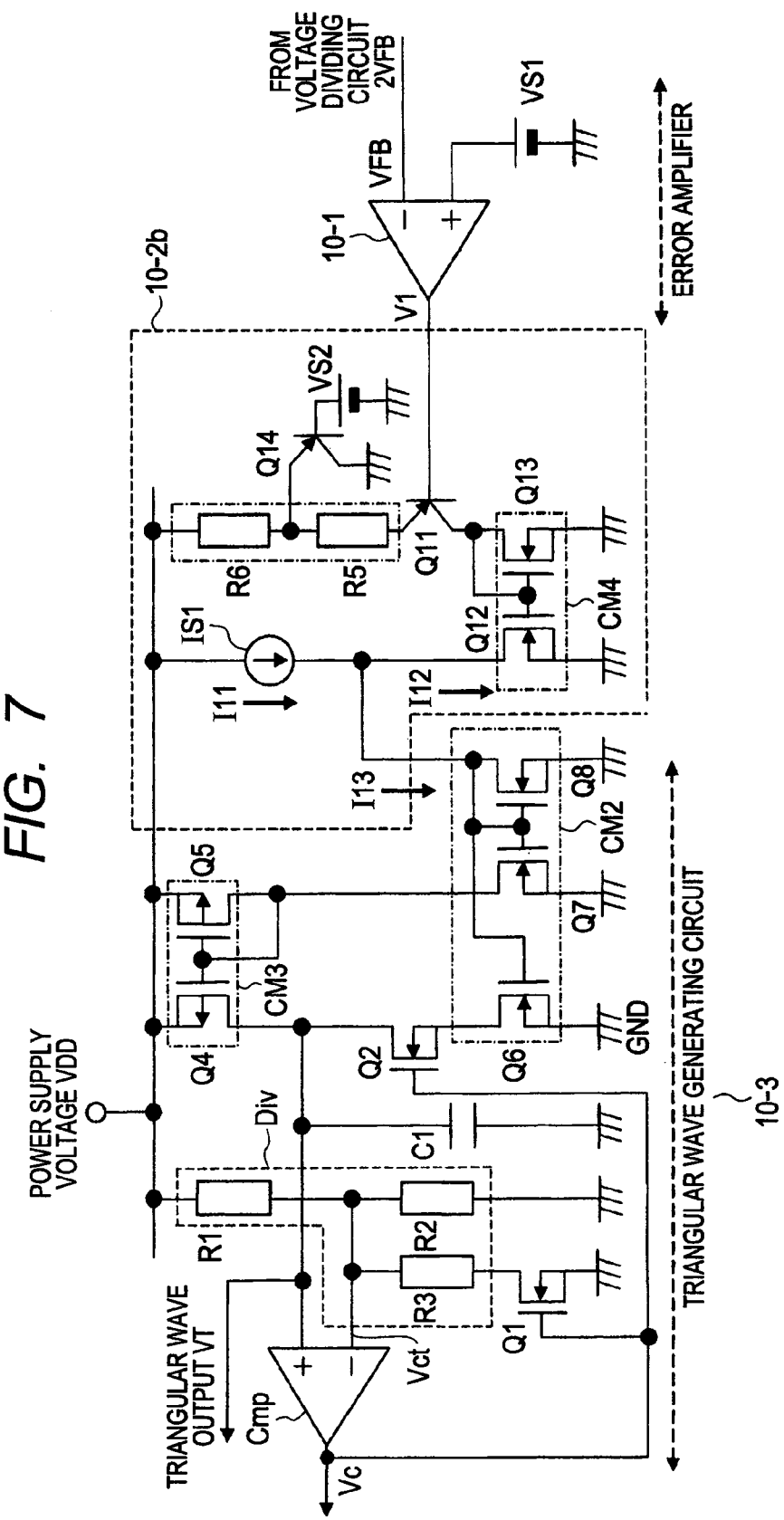
FIG. 7 is a circuit diagram representing a concrete configuration comprehending an oscillation frequency control circuit and a triangular wave generating circuit pertaining to a second embodiment of the present invention.

FIG. 7 is a circuit diagram representing a concrete configuration comprehending an oscillation frequency control circuit and a triangular wave generating circuit pertaining to the second embodiment.

A basic configuration of the present second embodiment is the same as for the first embodiment, as shown in FIG. 1. Among the components, the error amplifier 10-1, the triangular wave generating circuit 10-3, and the PWM control circuit 10-4 are the same as for the first embodiment. Therefore, further descriptions are provided hereinafter only for an oscillation frequency control circuit 10-2$b$.

The oscillation frequency control circuit 10-2$b$ includes, besides a transistor Q11, a current mirror circuit CM4 including MOSFETS Q12 AND Q13, a constant current source IS1, resistors R5, R6, a transistor Q14, and a reference voltage VS2.

Output of the error amplifier 10-1 is input to a gate terminal of the transistor Q11, as is the case for the first embodiment.

To an emitter terminal of the transistor Q11, the resistors R5, R6 which act as a load resistance are coupled. The transistor Q11 provides an emitter-follower output.

The current mirror circuit CM4 replicates a current flowing in a drain terminal of a MOSFET Q13 to a drain terminal of a MOSFET Q12.

The constant current source IS1 is a source from which a constant current I11 flows. This current I11, a current (designated by I12 herein) flowing in the current mirror circuit CM4, and an output current I13 of the oscillation frequency control circuit 10-2$b$ have the following relation.

$$I11=I12+I13$$

This equation is transformed into:

$$I13=I11-I12$$

From this equation, it can be understood that the smaller the current to be input to the current mirror circuit CM4, the larger will be the current to be input to the triangular wave generating circuit 10-3.

Then, a clamp circuit comprised of the reference voltage VS2 and the transistor Q14 is described.

In this clamp circuit, an emitter terminal of the transistor Q14 is coupled to a node coupling the resistors R5 and R6. Consequently, if a voltage on the emitter terminal of the transistor Q11 is higher than a voltage on the emitter terminal of the transistor Q14, no current flows in the current mirror circuit CM4. That is, when the output of the error amplifier 10-1 is equal to or more than a voltage prescribed by the clamp circuit, the triangular wave output of the triangular wave generating circuit 10-3 and the oscillation frequency of the PWM control circuit 10-4 remain constant. Conversely, after the output of the error amplifier 10-1 becomes lower than the voltage prescribed by the clamp circuit, the oscillation frequency of the PWM control circuit 10-4 starts to fall.

Then, operation is explained using a graph.

Figure 8:
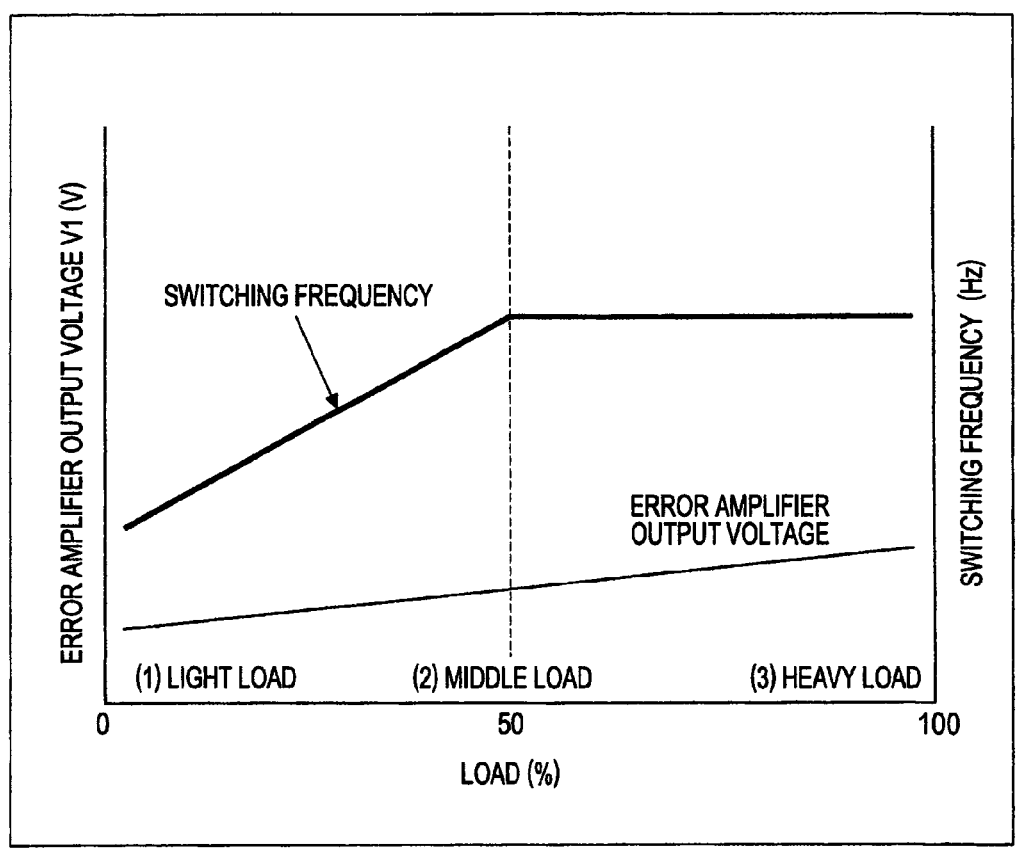
FIG. 8 is a graph to explain how the frequency of the oscillation frequency control circuit changes, pertaining to the second embodiment of the present invention.
Figure 9:
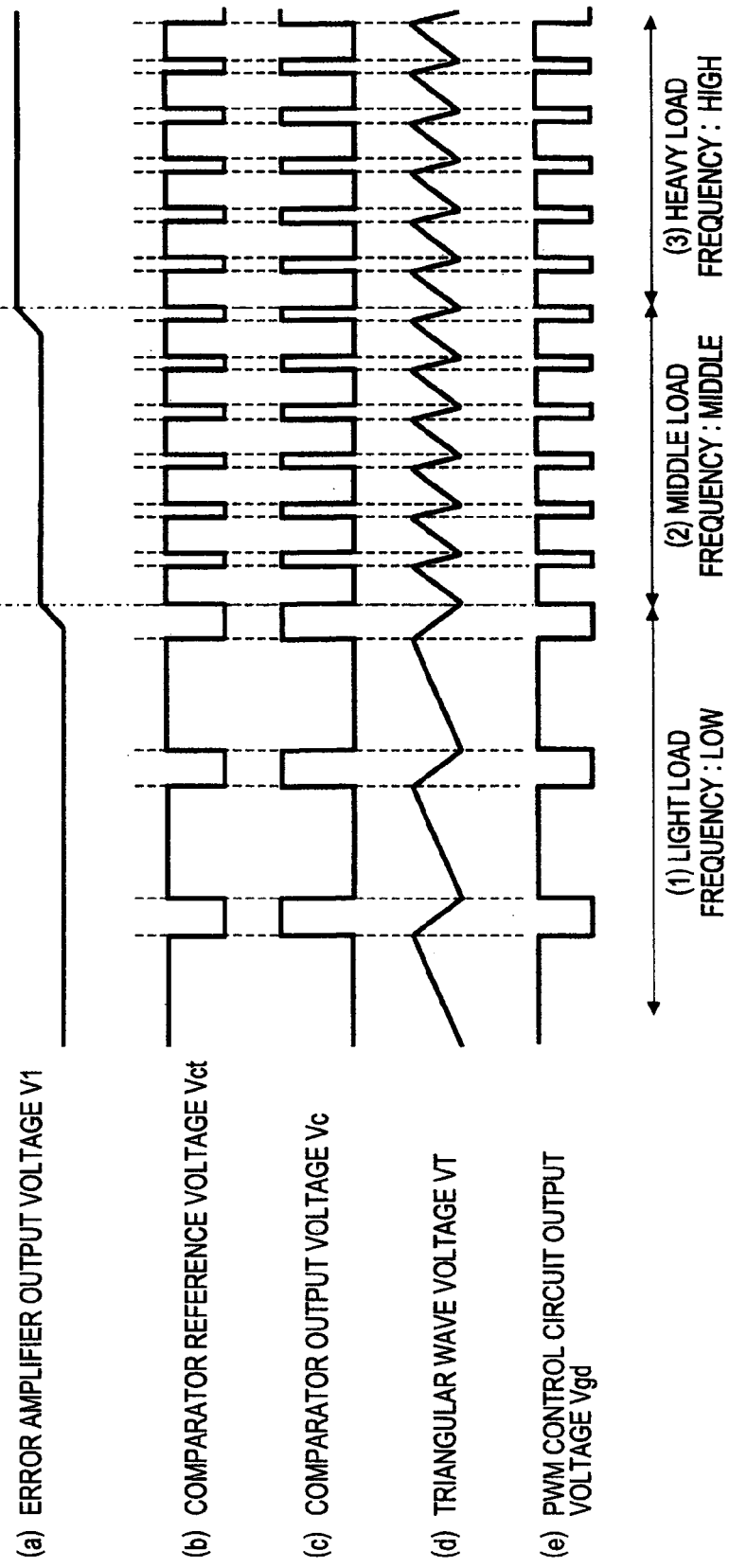
FIG. 9 is a graph showing the waveforms of outputs of a PFC controller in which the oscillation frequency control circuit pertaining to the second embodiment of the present invention is applied.

FIG. 8 is a graph to explain how the frequency of the oscillation frequency control circuit 10-2$b$ changes, pertaining to the second embodiment. FIG. 9 is a graph showing the waveforms of outputs of the PFC controller 10 in which the oscillation frequency control circuit 10-2$b$ pertaining to the second embodiment is applied.

As can be seen in FIG. 8, in the oscillation frequency control circuit 10-2$b$ of the preset second embodiment, the output voltage of the error amplifier 10-1 increases linearly, until the load reaches a certain value. The triangular wave output of the triangular wave generating circuit 10-3 and the oscillation frequency of the PWM control circuit 10-4 also increase proportionally.

However, when the output of the error amplifier 10-1 reaches and exceeds the voltage predefined by the clamp circuit in FIG. 7 (corresponding to load (2) in FIG. 8), the triangular wave output of the triangular wave generating circuit 10-3 and the oscillation frequency of the PWM control circuit 10-4 no longer increase (see FIG. 8 and FIG. 9).

This is clearly shown with regard to the triangular wave output of the triangular wave generating circuit 10-3, when you see a load range (2) and (3) in FIG. 8. That is, it is evident that the triangular wave voltage VT of the triangular wave generating circuit 10-3 and the oscillation frequency of the PWM control circuit 10-4 do not change, when the output of the error amplifier 10-1 becomes equal to or more than a certain level.

Thereby, it is possible to improve switching loss without increasing the frequency of the switch Q100 above the certain level.

Third Embodiment

Then, a third embodiment is described.

In the present third embodiment, the invention is envisioned to be applied to a continuous mode, interleaving type PFC controller. Here, the continuous mode is a mode in which switch operation is performed in a state that duplicate inductor currents are allowed to flow. The interleaving type is a type in which a pair of switches is operated alternately.

Figure 10:
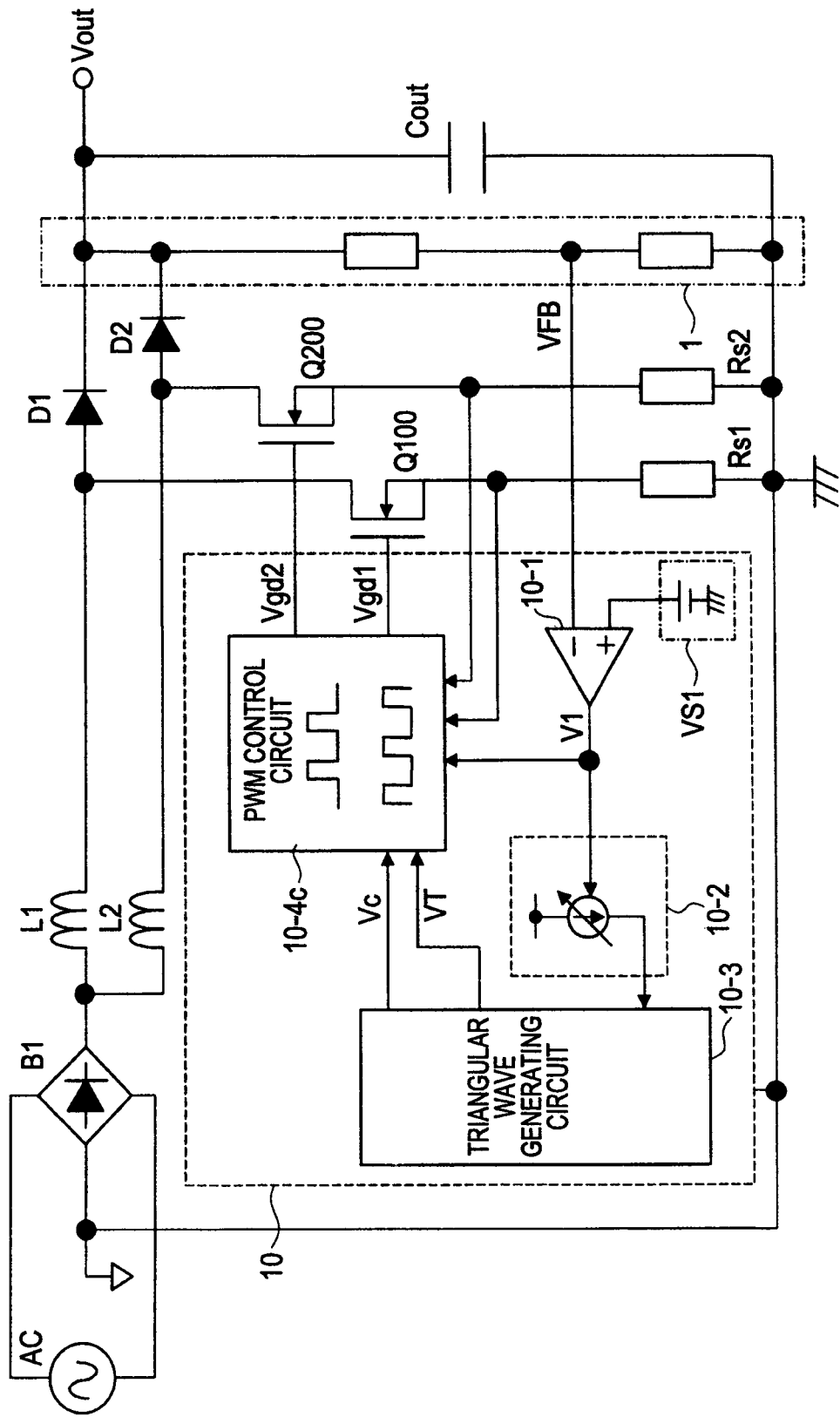
FIG. 10 is a circuit diagram representing a configuration of a power supply device pertaining to a third embodiment of the present invention.

FIG. 10 is a circuit diagram representing a configuration of a power supply device pertaining to the third embodiment.

The power supply device in the present third embodiment has two subsystems, in each of which charging and discharging an inductor are conducted by a switch, because of the interleaving type. One subsystem is comprised of an inductor L1, a diode D1 and a switch Q100 and the other subsystem is comprised of an inductor L2, a diode D2, and a switch Q200.

The PWM control circuit 10-4 is replaced by a PWM control circuit 10-4c to fulfill its role to control the two switches, i.e., one more switch added.

The PWM control circuit 10-4c takes input of voltage information about the switch Q100 and the switch Q200 in addition to input signals to the PWM control circuit 10-4. In order to detect voltage information for each switch, a resistor is inserted between each switch and ground. As shown in FIG. 10, a resistor Rs1 is inserted in one subsystem including the switch Q100 and a resistor Rs2 is inserted in the other subsystem including the switch Q200, respectively. Resistance values of these resistors are assumed to be Rs1=Rs2; in this case, there is no need to bias the control within the PWM control circuit 10-4c. However, the resistance values of the resistors Rs1 and Rs2 may be biased for any purpose.

Based on the voltage information for each switch, the PWM control circuit 10-4c is capable of implementing control in response to the status of each switch.

The PWM control circuit 10-4c has dual outputs in order to control the switches Q100 and Q200.

By configuring the power supply device in the way described above, it is possible to decrease the switching frequency and improve switching loss even in the power supply device using the continuous mode, interleaving type PFC controller.

Fourth Embodiment

A fourth embodiment is described. The present fourth embodiment is characterized in that a signal serving as a reference for control is a current that is supplied to an output terminal, instead of a voltage provided by the voltage dividing circuit 1.

Figure 11:
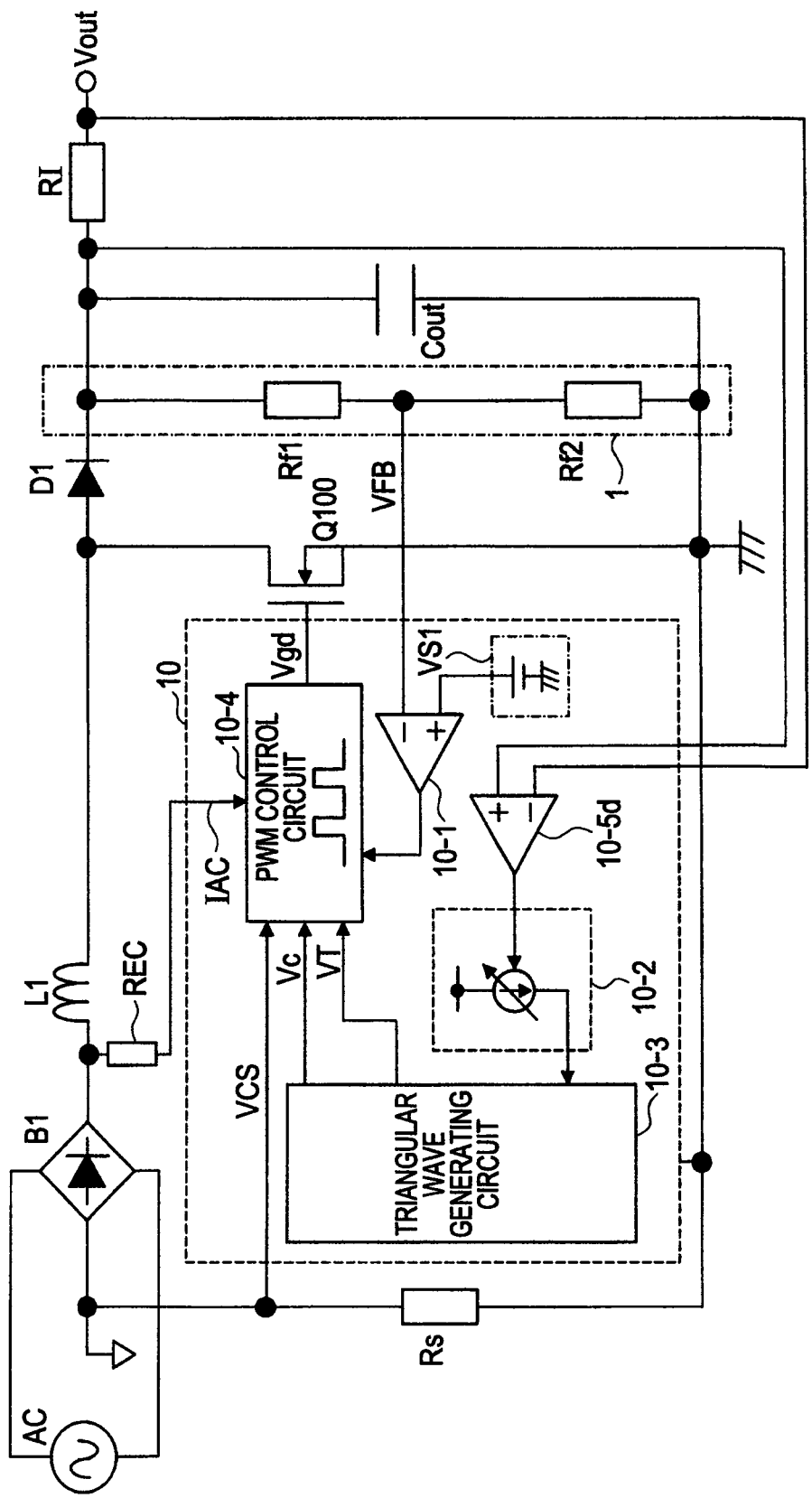
FIG. 11 is a circuit diagram representing a configuration of a power supply device pertaining to a fourth embodiment of the present invention.

FIG. 11 is a circuit diagram representing a configuration of a power supply device pertaining to the fourth embodiment.

In the fourth embodiment, a resistor for output current measurement R1 is inserted just before the output terminal. In the previous embodiments, the output of the error amplifier 10-1 is input to the oscillation frequency control circuit 10-2 (10-2b is also applicable). In contrast, in the present fourth embodiment, a potential difference amplifier 10-5d is added. A feature of the fourth embodiment is as follows. A voltage across the resistor for output current measurement R1 is amplified by the potential difference amplifier 10-5d and input to the oscillation frequency control circuit 10-2. Thereby, control of the PFC controller 10 is implemented, based on the current flowing across the resistor for output current measurement R1.

By configuring the power supply device in this way, it is also possible to decrease the switching frequency.

Although the technical concept of the present fourth embodiment is applied to the first embodiment, it can also be applied to the second embodiment.

While the invention made by the present inventors has been described specifically based on its embodiments hereinbefore, it will be obvious that the present invention is not limited to the described embodiments and various modifications may be made without departing from the scope of the invention.

What is claimed is:

1. A power supply device converting an alternate current voltage to a direct current voltage, comprising:
    an output terminal and a ground terminal;
    a diode bridge to which the alternate current voltage is input;
    an inductor coupled to an output of the diode bridge;
    a diode whose anode is electrically coupled to the inductor and whose cathode is electrically coupled to the output terminal;
    a capacitor electrically coupled between the output terminal and the ground terminal;
    a switch electrically coupled between the anode of the diode and the ground terminal;
    a voltage dividing circuit dividing a voltage between the output terminal and the ground terminal; and
    a PFC controller that includes an error amplifier amplifying a difference between an output voltage of the voltage dividing circuit and a reference voltage, an oscillation frequency control circuit converting an output of the error amplifier to a current, a triangular wave generating circuit outputting a triangular wave from an output current of the oscillation frequency control circuit, and a PWM control circuit opening and closing the switch, based on the triangular wave output by the triangular wave generating,
    wherein the triangular wave generating circuit comprises another capacitor and outputs the triangular wave by charging and discharging the another capacitor,
    the triangular wave generating circuit further comprises a first current mirror circuit having two outputs, and a second current mirror circuit having one output, and
    a current output of the second current mirror circuit is a replica of one current output of the first current mirror circuit.

2. The power supply device according to claim 1,
    wherein the power supply device is a continuous mode type in which currents are interleaved, and
    wherein the PWM control circuit controls a switch in each of subsystems respectively.

3. The power supply device according to claim 1,
    wherein the other current output of the first current mirror circuit and the current output of the second current mirror circuit are coupled via a MOSFET, and wherein the MOSFET conducts charging and discharging the another capacitor coupled to a node coupling the MOSFET and the current output of the second current mirror circuit.

4. The power supply device according to claim 3,
wherein the triangular wave generating circuit further comprises an operational amplifier to which a constant voltage is input, and
wherein the operational amplifier compares a voltage on the node coupling the another capacitor, the current output of the second current mirror circuit, and the MOSFET to the constant voltage, and the another capacitor is charged and discharged by opening and closing the MOSFET.

5. The power supply device according to claim 4, wherein a voltage on the node coupling the current output of the second current mirror circuit, the MOSFET, and the operational amplifier is output as the triangular wave.

6. The power supply device according to claim 1,
wherein the oscillation frequency control circuit comprises a transistor, and
wherein an output of the error amplifier is input to a gate terminal of the transistor.

7. The power supply device according to claim 6,
wherein a third current mirror circuit is coupled to a collector terminal of the transistor, and
wherein a current output of the third current mirror circuit is an output of the oscillation frequency control circuit.

8. The power supply device according to claim 6,
wherein the oscillation frequency control circuit further comprises a constant current source,
wherein a fourth current mirror circuit is coupled to the collector terminal of the transistor, and
wherein a current resulting from subtracting an output of the fourth current mirror circuit from an output current of the constant current source is an output current of the oscillation frequency control circuit.

9. The power supply device according to claim 8, wherein the oscillation frequency control circuit further comprises a clamp circuit coupled to an emitter terminal of the transistor.

10. A power supply device comprising:
a resistor for output current measurement; and
a PFC controller that comprises a potential difference amplifier amplifying a voltage across the resistor for output current measurement, a triangular wave generating circuit outputting a triangular wave from an output current of the potential difference amplifier, and a PWM control circuit opening and closing a switch, based on the triangular wave output by the triangular wave generating circuit,
wherein the triangular wave generating circuit comprises a capacitor and outputs the triangular wave by charging and discharging the capacitor,
the triangular wave generating circuit further comprises a first current mirror circuit having two outputs and a second current mirror circuit having one output, and
a current output of the second current mirror circuit is a replica of one current output of the first current mirror circuit.

11. A semiconductor device for power factor correction of a power supply device, comprising:
an error amplifier amplifying a difference between a voltage that is input thereto which changes depending on an output voltage of the power supply device and a reference voltage;
an oscillation frequency control circuit converting an output of the error amplifier to a current;

a triangular wave generating circuit outputting a triangular wave from an output current of the oscillation frequency control circuit; and
a PWM control circuit opening and closing a switch in the power supply device, based on the triangular wave output by the triangular wave generating circuit,
wherein the triangular wave generating circuit comprises a capacitor and outputs the triangular wave by charging and discharging the capacitor,
the triangular wave generating circuit further comprises a first current mirror circuit having two outputs and a second current mirror circuit having one output, and
a current output of the second current mirror circuit is a replica of one current output of the first current mirror circuit.

12. The semiconductor device according to claim 11,
wherein the other current output of the first current mirror circuit and the current output of the second current mirror circuit are coupled via a MOSFET, and
wherein the MOSFET conducts charging and discharging the capacitor coupled to a node coupling the MOSFET and the current output of the second current mirror circuit.

13. The semiconductor device according to claim 12,
wherein the triangular wave generating circuit further comprises an operational amplifier to which a constant voltage is input, and
wherein the operational amplifier compares a voltage on the node coupling the capacitor, the current output of the second current mirror circuit, and the MOSFET to the constant voltage, and the capacitor is charged and discharged by opening and closing the MOSFET.

14. The semiconductor device according to claim 13, wherein a voltage on the node coupling the current output of the second current mirror circuit, the MOSFET, and the operational amplifier is output as the triangular wave.

15. The semiconductor device according to claim 14, wherein a third current mirror circuit is coupled to a collector terminal of the transistor and a current output of the third current mirror circuit is an output of the oscillation frequency control circuit.

16. The semiconductor device according to claim 11,
wherein the oscillation frequency control circuit comprises a transistor, and
wherein an output of the error amplifier is input to a gate terminal of the transistor.

17. The semiconductor device according to claim 16,
wherein the oscillation frequency control circuit further comprises a constant current source,
wherein a fourth current mirror circuit is coupled to the collector terminal of the transistor, and
wherein a current resulting from subtracting an output of the fourth current mirror circuit from an output current of the constant current source is an output current of the oscillation frequency control circuit.

18. The semiconductor device according to claim 17, wherein the oscillation frequency control circuit further comprises a clamp circuit coupled to an emitter terminal of the transistor.

19. The semiconductor device according to claim 11,
wherein the power supply device is a continuous mode type in which currents are interleaved, and
wherein the PWM control circuit controls a switch in each of subsystems respectively.

* * * * *